United States Patent
Kim et al.

(10) Patent No.: US 6,532,530 B1
(45) Date of Patent: Mar. 11, 2003

(54) DATA PROCESSING SYSTEM AND METHOD FOR PERFORMING ENHANCED PIPELINED OPERATIONS ON INSTRUCTIONS FOR NORMAL AND SPECIFIC FUNCTIONS

(75) Inventors: Hong-Kyu Kim, Kyunggi-do (KR); Yong-Chun Kim, Kyunggi-do (KR); Seh-Woong Jeong, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/417,667

(22) Filed: Oct. 14, 1999

(30) Foreign Application Priority Data

Feb. 27, 1999 (KR) ............................................. 99-06601

(51) Int. Cl.[7] ................................................. G06F 9/30
(52) U.S. Cl. ......................................... 712/35; 712/34
(58) Field of Search ........................... 712/35, 34, 213, 712/225

(56) References Cited

U.S. PATENT DOCUMENTS

| | | | | |
|---|---|---|---|---|
| 5,721,945 A | * | 2/1998 | Mills et al. ..................... 700/2 |
| 5,790,824 A | * | 8/1998 | Asghar et al. ............... 712/209 |
| 5,923,893 A | * | 7/1999 | Moyer et al. ................ 712/200 |
| 5,968,162 A | * | 10/1999 | Yard ........................... 712/203 |
| 5,996,058 A | * | 11/1999 | Song et al. .................. 710/264 |
| 6,002,881 A | * | 12/1999 | York et al. ................... 711/147 |
| 6,003,124 A | * | 12/1999 | Laborie ....................... 709/400 |
| 6,279,096 B1 | * | 8/2001 | McCoy et al. .............. 711/211 |
| 6,338,108 B1 | * | 1/2002 | Motomura ................... 710/110 |

\* cited by examiner

*Primary Examiner*—Eric Coleman

(57) ABSTRACT

A microprocessor with an efficient and powerful coprocessor interface architecture is provided. The microprocessor has a set of generic coprocessor instructions on its instruction map and interface signals dedicated to the coprocessor interface. Depending on which coprocessor is interfaced to the microprocessor, the generic.coprocessor instructions are renamed to the specific coprocessor commands. When a coprocessor instruction for a specific function is fetched and decoded by the host processor, the appropriate command is issued through the coprocessor interface signals to the coprocessor and the coprocessor performs the required tasks. Hence, the coprocessor interfaced with the host processor need not have its own program. The pipelined operations of the coprocessor are synchronized with pipelined operations of the host processor.

29 Claims, 9 Drawing Sheets

DATA PROCESSING SYSTEM AND METHOD FOR PERFORMING ENHANCED PIPELINED OPERATIONS ON INSTRUCTIONS FOR NORMAL AND SPECIFIC FUNCTIONS

FIELD OF THE INVENTION

The present invention relates to a data processing system with a host processor and a coprocessor, and more particularly to a pipelined data processing system having a host processor and a coprocessor which are implemented on a single chip and method of interfacing between the processors for performing enhanced pipelined operations.

BACKGROUND OF THE INVENTION

With an explosive growth in the market of portable electronic products, technological emphasis in VLSI (Very Large Scale Integration) circuit design is shifting away from high speed to low power. However, high-speed functions are still indispensable for a microprocessor (or microcontroller) performing complex mathematical computation operations, for example, multiplications. Such need for speed becomes more pronounced in RISC (Reduced Instruction Set Computer) type processors, DSP (Digital Signal Processing) units, and graphic accelerators because these devices have increased demand for multimedia applications.

As demand grows for enhanced performance of microprocessor-based data processing systems, more complex techniques have been developed and used in microprocessor designs. For example, pipelined data processing techniques such as division of processor operations into multiplicity of elementary suboperations are employed.

With reference to FIGS. 1A and 1B, an execution of an instruction, requiring time T for the execution in a non-pipelined mode of operation, is divided into a plurality of suboperation stages in a pipelined mode of operation. For example, three-stage pipelined mode of operation typically has three suboperation stages, such as ST1, ST2, and ST3. A processor in a pipelined mode is partitioned in such a manner that each suboperation of a pipelined instruction is completed in a predefined stage time period $T^s$. As a result of such partitions on an instruction, an execution of such pipelined instruction requires three stage time periods $3T^s$, which is longer than time T required for an execution of an instruction in a non-pipelined mode of operation.

In a pipelined mode of operation in which a processor separately executes each suboperation by partitioning a pipelined instruction, however, a processing of a pipelined instruction can be initiated after a stage time period $T^s$ rather than after a time period T as in the non-pipelined mode of operation. Since a stage time period $T^s$ for an execution of each suboperation of a pipelined instruction is shorter than time T for an execution of an non-pipelined instruction, the execution of an instruction in a pipelined mode of operation can be expedited. A stage time period $T^s$ can be chosen as small as possible consistent with the number of suboperation stages in a pipelined mode of operation unit.

Recent advancements in VLSI technology have made DSP technology readily available, so that it is not difficult to find electronic products equipped with some form of multimedia DSP capability. Many consumer electronic products with multimedia DSP capability have a microprocessor chip for the control and I/O operations and a separate DSP chip for signal processing.

A SOC (System-On-a-Chip) approach is attracting attention of chip designers (particularly, ASIC designers) because such design represents savings in cost, power consumption, system design complexity, and system reliability as compared to designs having two or more separate processors.

A simple solution to an integration of, for example, a microprocessor core and a DSP core is to put the two independent cores on a single die (i.e., a microprocessor core for control tasks and a DSP core for signal processing algorithms). This simple two-core approach can provide chip designers with a flexibility in choosing any application specific pair of microprocessor cores and DSP cores to fit a target application optimally. This approach, however, suffers from several drawbacks: (1) Ill Programmability, because the cores should have their own programs and data; (2) Communication Overhead, because resource conflicts, false data dependencies and deadlocks need to be prevented through a complex scheme; and (3) Hardware Overhead due to the duplicated part of the two cores, which results in increased hardware cost and power inefficiency.

Another way to support microprocessor and DSP capabilities on a chip is to use a single processor having both the capabilities, for example, a microprocessor with DSP capabilities or a DSP unit with powerful bit manipulation and branch capabilities.

In general, a microprocessor is a necessary element in electronic products; therefore, there are motivations on the part of designers to integrate a SOC design around a microprocessor. Compared with the two-core approach, the SOC approach can achieve efficient communications between a microprocessor (or a host processor) and its interfaces, for example, coprocessors. By equipping the microprocessor with DSP coprocessor instructions and interface scheme, control functions and DSP functions can be implemented on a single processor chip which also provides a single development environment. The SOC approach also has other advantages over the two-core approach. For example, DSP programs can be written easily by using coprocessor instructions of a host processor, and hardware cost can be reduced because there is no hardware duplication.

The overall processing efficiency in such a host-coprocessor SOC architecture is a function of a number of factors: for example, the computing capability of a coprocessor and the information exchange capability between a host processor and a coprocessor. The computing capability of a coprocessor depends upon how many instructions the coprocessor has and how fast the coprocessor executes each instruction. Such features of a coprocessor are knowable by its specification. Thus, an improvement of a coprocessor performance can be achieved by using, within cost limits, a coprocessor with specification of desired features. On the other hand, the information exchange capability between a host processor and a coprocessor is affected by coprocessor interface protocols of a host processor, rather than a coprocessor performance.

In such conventional host-coprocessor SOC techniques, however, in order to improve the coprocessor capabilities., more powerful coprocessor instructions with appropriate data paths needed to be added to a host processor. Such design is tantamount to a new processor chip. If there is a bottleneck in the information exchange between the host and coprocessor, the system performance will not be improved. Hereinafter, an example of such a bottleneck in the information exchange will be explained.

FIG. 2 is a timing diagram showing pipelined executions of three subsequent instructions I1, I2, and I3 in a typical RISC-based host-coprocessor system. Each instruction I1, I2 or I3 of a RISC instruction pipeline, so-call three-stage pipeline, has three stages: Instruction Fetch (IF), Instruction Decode (ID), and Execution (EX) stages. Each of the three stages IF, ID and EX for an instruction is intended to be completed in a single cycle of a clock signal CLK.

For the purpose of explanation, in FIG. 2, a first instruction I1 is assumed to be a host processor instruction for an execution of a host processor operation, and second and third instructions I2 and I3 are coprocessor instructions for execution of coprocessor operations. The first instruction I1 is ready to be executed by the host processor alone without coprocessor interfacing, and the second and third instructions I2 and I3 are intended to be executed by the coprocessor responsive to coprocessor commands I2' and I3' (corresponding to instructions I2 and I3, respectively) and coprocessor interface signals INF which are issued by the host processor depending on results of decoding the coprocessor instructions I2 and I3.

Referring to FIG. 2, first, the host processor instruction I1 is fetched during cycle T0. That is, the instruction I1 is loaded from a program memory into the host processor. In the next cycle T1, the instruction I1 is decoded therein and at the same time the coprocessor instruction I2 is fetched. The host processor instruction I1 is executed by host processor during cycle T2, in which the coprocessor instructions I2 and I3 are simultaneously decoded and fetched, respectively. During cycle T3, the host processor issues the coprocessor command I2' corresponding the instruction I2 and also produces coprocessor interface signals INF for the instruction I2. Thus, the coprocessor is interfaced with the host processor under the control of the interface signals INF and then completes decoding of the command I2' from the host processor. During cycle T4, the coprocessor executes the command I2'.

Due to the execution of the command I2' associated with the instruction I2 in cycle T4, the instruction pipeline has to be stalled for one clock cycle. Hence, the execution stage of the instruction I3 should be suspended for one cycle and then executed in cycle T5. The coprocessor decodes the command I3' corresponding to the instruction I3 during cycle T5, and in the next cycle T6 the command I3' is executed by the coprocessor.

Thus, the pipeline stalling results when the respective coprocessor commands I2' and I3' are decoded in the same clock cycles as the corresponding coprocessor instructions I2 and I3 are executed. Such pipeline stalling behaves like a bottleneck in information exchanges between a host processor and a coprocessor, causing degradations in computing speed and system performance.

SUMMARY OF THE INVENTION

It is an object of the present invention to provide a low-power, low-cost, high-performance data processing system suitable for multimedia applications, specifically an improved host-coprocessor system-on-a-chip (SOC) performing pipelined operations.

It is another object of the present invention to provide a host-coprocessor SOC with an efficient and powerful coprocessor interface scheme.

It is still another object of the present invention to provide a method for accomplishing effective interfaces between a host processor performing pipelined operations and at least one coprocessor on a single chip.

These and other objects, features and advantages of the present invention are provided by a pipelined microprocessor which fetches an instruction, predecodes the fetched instruction when the fetched instruction is identified as a coprocessor instruction during an instruction fetch (IF) cycle of the instruction, and at least one coprocessor for performing additional specific functions. The microprocessor (host processor) issues to the coprocessor a coprocessor command corresponding to the fetched instruction. The coprocessor decodes the coprocessor command during an instruction decode/memory access (ID/MEM) cycle of the instruction and executes the decoded coprocessor command during an instruction execution (EX) cycle of the fetched instruction.

According to a preferred embodiment of the present invention, the host processor generates a plurality of coprocessor interface signals (e.g., A, B, C and D) when the fetched instruction is identified as a coprocessor instruction. Through the coprocessor interface signals the host processor issues the coprocessor command corresponding to the coprocessor instruction. The coprocessor provides its status data to the host processor after executing the coprocessor command in the EX cycle of the instruction.

A data memory is commonly connected to both the host processor and the coprocessor. The coprocessor accesses the data memory only at time designated by the host processor, and during which the host processor is guaranteed not to access the data memory. An internal clock generation circuit is provided for the host processor and the coprocessor. The internal clock generation circuit generates internal clock signals synchronized with an external clock signal. The host processor generates the coprocessor interface signals, synchronizing with one of the internal clock signals.

According to another aspect of the present invention, in order to execute the coprocessor instruction for a specific function, while performing operations for normal control functions, the host processor checks in an IF stage if the fetched instruction is a coprocessor instruction. If so, the host processor predecodes the fetched instruction during the IF stage. Then, the host processor issues a coprocessor command corresponding to the fetched instruction in the ID/MEM stage of the instruction. The coprocessor then decodes the coprocessor command in the ID/MEM stage, and executes a coprocessor operation designated by the coprocessor command in the EX stage of the instruction. The coprocessor provides the host processor with coprocessor status data after the execution of the coprocessor operation in the EX stage. Then, the host processor evaluates the coprocessor status data to provide for a next conditional branch instruction.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

The present invention will be described in detail with reference to the accompanying drawings. In the following description, specific details are set forth in order to provide a more thorough understanding of the invention. However, the invention may be practiced without such particulars. In some instances, well known elements have not been shown or described to avoid unnecessarily obscuring the present invention. Accordingly, the specification and drawings are to be regarded as illustrative, rather than restrictive.

An efficient and powerful interfacing architecture of the host-coprocessor system of the present invention may be applied to a low-power RISC microprocessor. The efficiency and flexibility of the interfacing architecture are also important to microprocessors with a relatively low bit width (e.g., 8 or 16 bits), which are commonly used for products of low-cost markets, such as consumer electronic market and toy market.

A host processor (or microprocessor) according to the present invention has a set of generic coprocessor instructions on its instruction map and a set of core pin signals for performing interfaces with at least one coprocessor. The generic coprocessor instructions are renamed to specific coprocessor commands, depending on which coprocessor(s), such as DSP unit(s) or floating-point processor(s), is interfaced with the host processor.

When a coprocessor instruction is fetched and predecoded by the host processor, the host processor issues appropriate commands through coprocessor interface signals to the coprocessor(s), and the coprocessor(s) performs tasks designated by the appropriate commands. Hence, the coprocessor(s) interfacing with the host processor is passive in a sense that it does not have its own program memory. Pipeline mode operations of the coprocessor(s) are synchronized with those of the host processor in a specific manner. Such a synchronization can prevent resource conflicts between the host processor and the coprocessor(s) in their accessing resources, such as data memory. Such features relating to the synchronization will be described in detail below.

Microprocessor Architecture

Figure 1A:
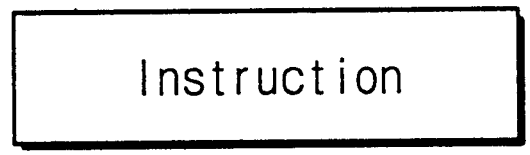
FIGS. 1A and 1B illustrate the division of an operation of an instruction into multiple suboperations.
Figure 1A:
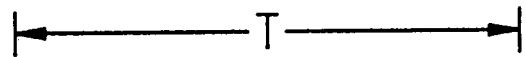
Figure 1B:
Figure 1B:
Figure 2:
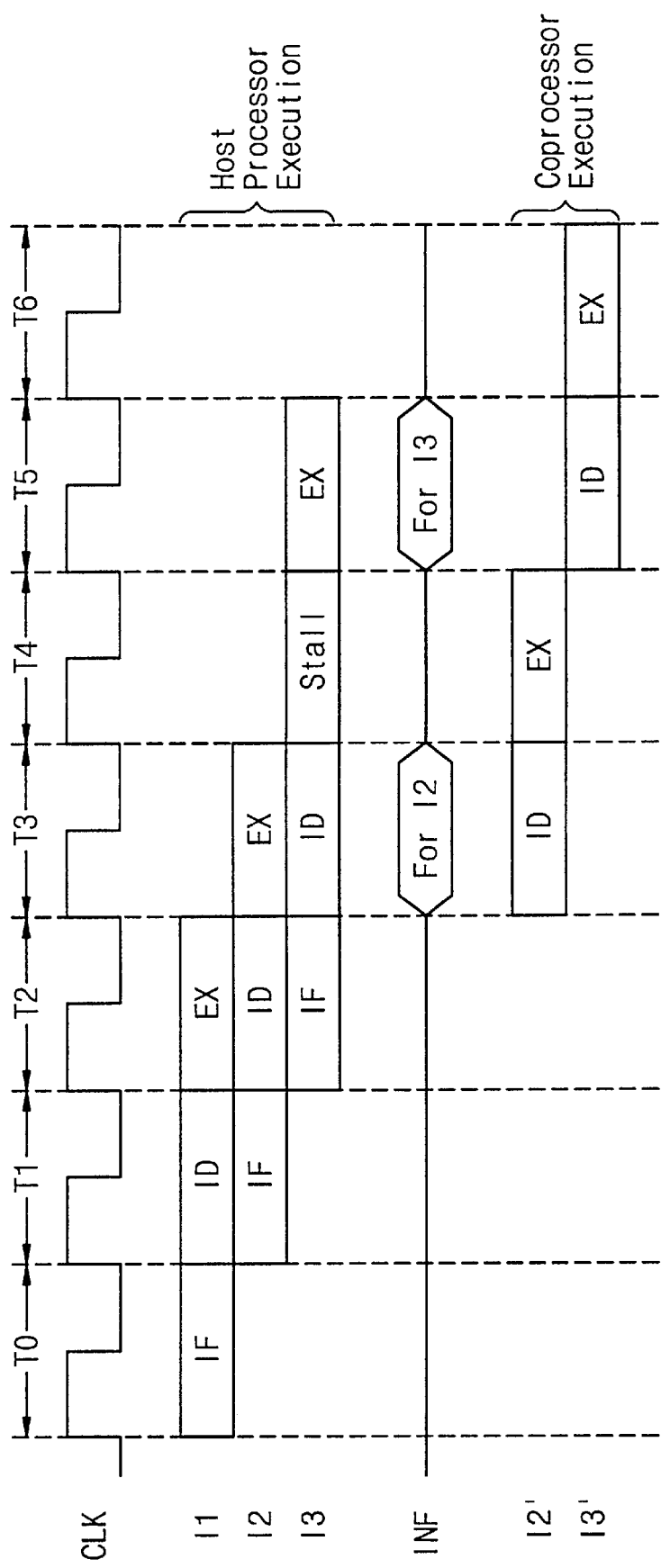
FIG. 2 is a timing diagram illustrating an example of pipelined mode operations of a typical RISC-based host-coprocessor system.
Figure 3:
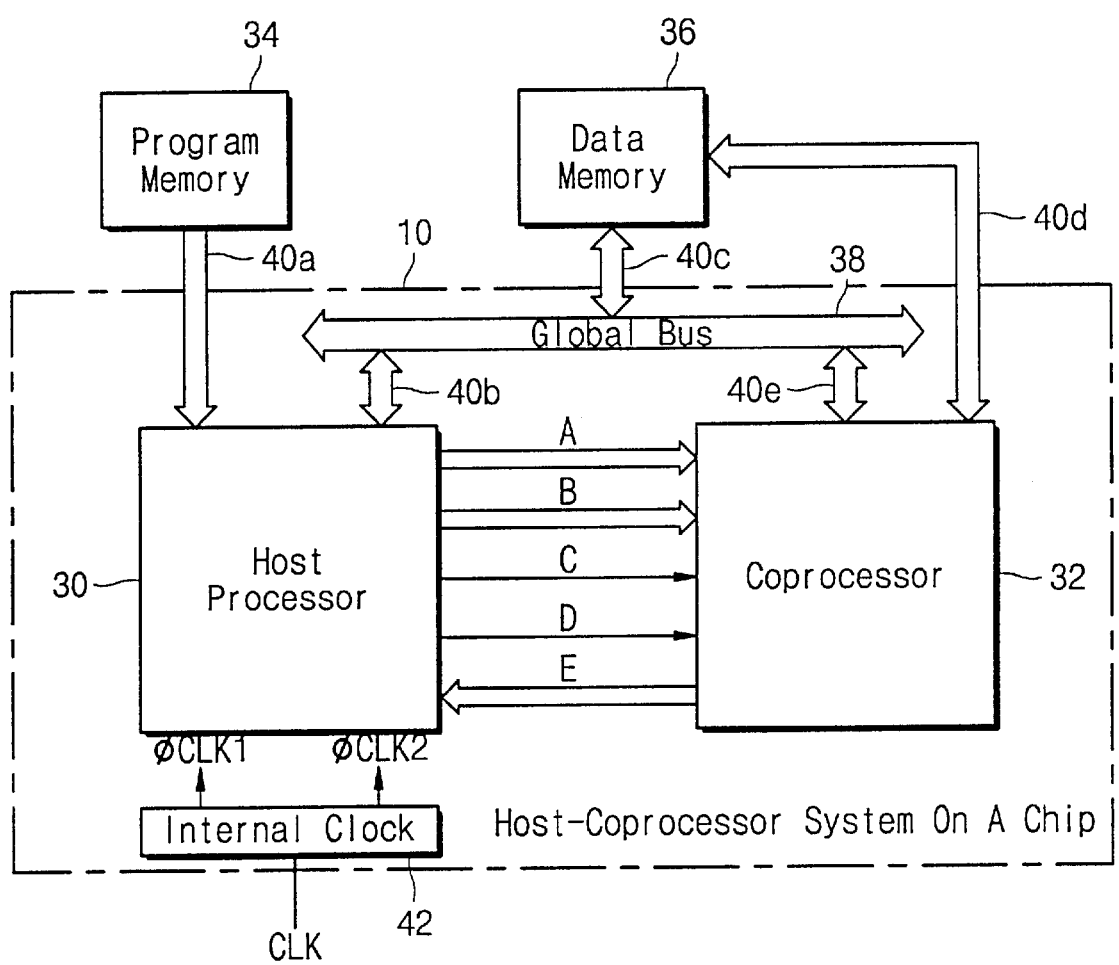
FIG. 3 is a block diagram illustrating a preferred embodiment of an SOC type of host-coprocessor system according to the present invention.
Figure 6:
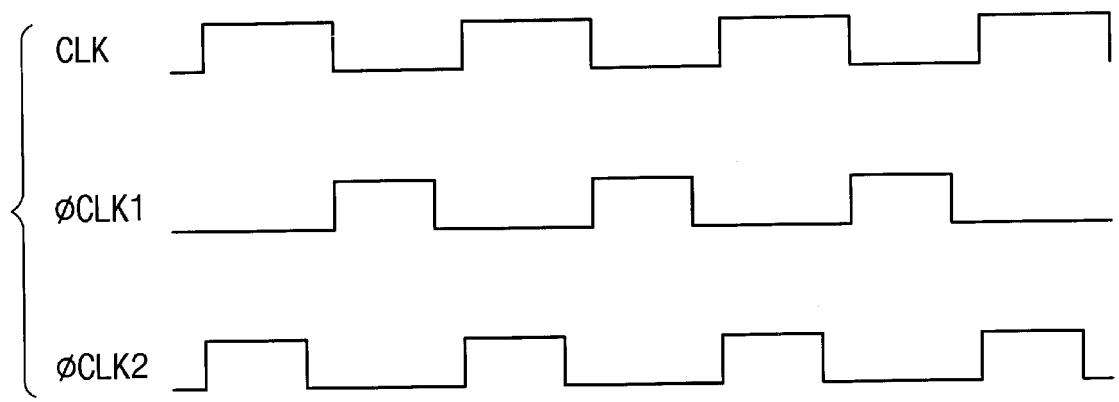
FIG. 6 is a timing diagram illustrating a master clock signal and internal clock signals used in the host-coprocessor system of FIGS. 3 and 5.

In FIG. 3, a preferred embodiment of an SOC (system-on-a-chip) type host-coprocessor system according to the present invention is illustrated in block diagram form. An SOC type host-coprocessor system 10 includes a host processor 30, such as a general-purpose microcontroller or microprocessor, and a coprocessor 32, such as a digital signal processing (DSP) unit or a floating-point processing unit. The host processor 30 performs normal control functions and the coprocessor 32 performs additional specific functions. The system 10 also includes several internal buses 38 and 40a–40d. The system 10 is connected to a program memory 34 such as a ROM (read-only memory) and to a data memory 36 such as a DRAM (dynamic random access memory) through the buses 38 and 40a–40d. The program and data memories 34 and 36 store instructions and data items, respectively. The program memory 34 may be incorporated within the system 10. The system 10 further includes an internal clock generation circuit 42 which receives an externally applied clock signal (a so-called master clock) CLK and generates two internal clock signals $\phi$CLK1 and $\phi$CLK2 synchronized with the external clock signal CLK. A timing diagram illustrating the external and internal clock signals is shown in FIG. 6.

For the purpose of explanation, it is assumed that the host processor 30 is an 8-bit ultra-low power embedded microprocessor which adopts a register-memory Harvard RISC architecture. The host processor 30 has a separate data memory address space and a program memory address space since it adopts such a Harvard architecture. The host processor 30 is also assumed to have sixteen general purpose registers, eleven special purpose registers, and a 32-level hardware stack, which are not shown in FIG. 3. In addition, the maximum of the program memory address space is preferred to be 1M words (20-bit program address lines) and the maximum of the data memory address space is preferably 64K bytes (16-bit data address lines). The coprocessor 32 is preferably a 16-bit fixed-point DSP coprocessor, which may be applied to cost-sensitive low-end multimedia DSP applications. The host processor 30 is pipelined and has 3 stages for a pipelined operation, such as IF (Instruction Fetch), ID/MEM (Instruction Decode and Data Memory Access), and EX (Execution) stages.

In IF stage, an instruction is fetched from the program memory 34 and early decoding (or predecoding) of the instruction is carried out. The host processor 30 checks whether the fetched instruction is a coprocessor instruction before the fetched instruction is loaded into instruction registers (IR) (not shown) of the host processor 30. In ID/MEM stage, the fetched instruction is decoded and ALU (arithmetic and logic unit) operands are latched into ALU registers (not shown) of the host processor 30. Data memory accesses, hardware stack accesses, special purpose registers accesses, and general-purpose registers accesses are also performed in ID/MEM stage. In EX stage, ALU operations and write-back operations into the general purpose registers occur.

When a fetched instruction has been identified as a coprocessor instruction, the host processor 30, during ID/MEM period, provides the coprocessor 32 with several interface signals corresponding to the fetched coprocessor instruction, such as A (e.g., 12 bits), B (e.g., 1 bit), C (e.g., 1 bit), and D (e.g., 1 bit). Signal A is an immediate value signal that indicates a coprocessor command or a coprocessor register address for a data transfer between the host processor 30 and the coprocessor 32. The coprocessor 32 decodes the signal A as a coprocessor command when signal B is active, or as a coprocessor register address when signal C is active. When data is transmitted from the host processor 30 to the coprocessor 32 (called a CO_WRITE operation), signal D becomes inactive (e.g., high). When data is transmitted from the coprocessor 32 to the host processor 30 (called a CO_READ operation), the signal D becomes active (e.g., low). The data transmission between the host processor 30 and the coprocessor 32 is carried out via their common buses 38, 40b and 40e.

The coprocessor 32 also provides, during the EX period of the host processor 30, with status flag data E (e.g., 3 bits)

depending on the execution of the coprocessor instruction. The host processor 30 then utilizes the status flag data E for generating conditional instructions for its next operations without additional coprocessor access operation. This will be described in detail later.

Coprocessor Interface of Host Processor

The interface between a host processor and a coprocessor requires the following aspects: (1) Synchronization of executions of the host processor and the coprocessor; (2) Commands issued to the coprocessor; (3) Data transfer between the host processor and the coprocessor; and (4) Flagging of coprocessor statuses to the host processor. The synchronization scheme between multiple processors should be carefully designed to prevent resource conflicts, false data dependency, and deadlocks. A handshake scheme (request/acknowledge) or a mailbox scheme is a simple solution for the synchronization, especially when the processors are autonomous. However, the processors with such a synchronization scheme suffer from lack of efficiency and hardware overhead.

A host-coprocessor system according to the present invention may relieve such synchronization problems because coprocessor(s) in the host-coprocessor system is passive (or non-autonomous) in a sense that it performs only tasks designated and at a certain time(or cycle) designated, respectively, by the host processor 30.

Figure 4:
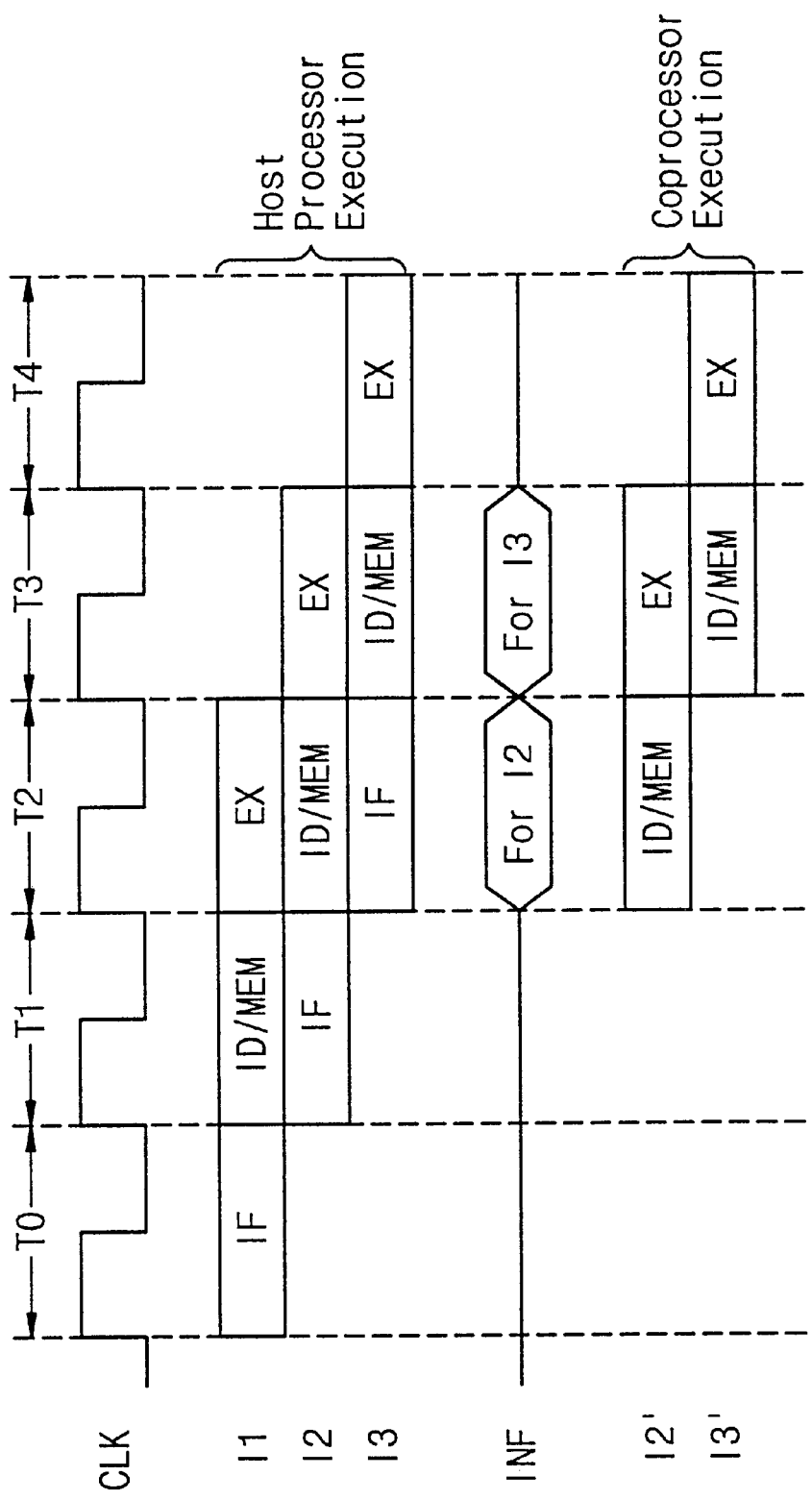
FIG. 4 is a timing diagram illustrating an example of pipelined mode operations of the system of FIG. 3.

FIG. 4 is a timing diagram illustrating pipelined executions of three subsequent instructions within the system of FIG. 3. A coprocessor instruction is identified and predecoded in an IF period. During an ID/MEM period, then, the host processor 30 provides the coprocessor 32 with a plurality of coprocessor interface signals A, B, C and D based on information predecoded from the coprocessor instruction. Such a scheme of identifying and predecoding a coprocessor instruction will be described in detail below.

For the purpose of explanation, the first instruction I1 is assumed to be a host processor instruction for an execution of a host processor operation, and the other instructions I2 and I3 coprocessor instructions for executions of coprocessor operations. Thus, the first instruction I1 is only executed by the host processor 30 without coprocessor interfacing, but the second and third instructions I2 and I3 are executed by the coprocessor 32 responsive to coprocessor commands I2' and I3' corresponding to the instructions I2 and I3, respectively. The coprocessor commands I2' and I3' are loaded on the coprocessor interface signals INF (i.e., A, B, C and D). The interface signals INF are issued by the host processor 30 depending on predecoded results of the coprocessor instructions I2 and I3.

With reference to FIG. 4, the first instruction I1 is fetched during cycle T0. That is, the instruction I1 is loaded from the program memory 34 into the host processor 30. The host processor 30 then checks whether the fetched instruction I1 is a coprocessor instruction or not. In the next cycle T1, if the fetched instruction I1 is not a coprocessor instruction, the instruction I1 is decoded by the host processor 30. At the same time, the next instruction I2 is fetched and determined whether it is a coprocessor instruction. The host processor 30 then predecodes the instruction I2 when it is a coprocessor instruction, and produces a plurality of predecoding signals DCOP, DCLDW and DCLDR (shown in FIG. 5).

In cycle T2, the host processor instruction I1 is executed, and during the same cycle the next instruction I3 is fetched. If the instruction I3 is identified as a coprocessor instruction, the host processor 30 produces a plurality of predecoding signals based on predecoded results of the coprocessor instruction I3. The host processor 30 also issues a coprocessor command I2' by providing the coprocessor 32 with interface signals INF (i.e., A, B, C and D) depending on predecoded results of the instruction I2. During cycle T2, the coprocessor 32 decodes the command I2'.

In cycle T3, the command I2' is executed by the coprocessor 32 and the host processor 30 issues a coprocessor command I3' by providing the coprocessor 32 with interface signals INF (i.e., A, B, C and D) on the basis of the predecoding results of the instruction I3. The coprocessor 32 then decodes the command I3' and executes the command I2'. In cycle T4, the command I3' is executed by the coprocessor 32.

Even though FIG. 4 shows only three subsequent instructions, the diagram may similarly continue in both directions prior to the instruction I1 and after the instruction I3.

As described above, the predecoding of instructions in IF stages makes it possible to decode the coprocessor commands I2' and I3' in cycles T2 and T3 (i.e., in the ID/MEM stages of the corresponding instructions I2 and I3). That is, the host processor's ID/MEM and EX stages are completely replaced by the corresponding stages of the coprocessor. As a result, the pipeline stalling does not occur, thereby improving the operation speed.

In an instruction map of the host processor 30 of the present invention, some instruction space is reserved for coprocessor interface instructions shown in Table 1.

TABLE 1

| Coprocessor Interface Instructions | | | |
|---|---|---|---|
| Mnemonic | Op1 | Op2 | Description |
| COP | #imm:12 | — | Coprocessor Operation |
| CLD | Reg | #imm:8 | Data transfer from coprocessor |
| CLD | #imm:8 | Reg | Data transfer to coprocessor |
| JMP | E<0–2> | label | Conditional branch with coprocessor status flags |
| CALL | | | |
| LNK | | | |
| JNZD | Reg | label | Delayed jump when non zero with auto-decrement register |

As mentioned earlier, a coprocessor instruction is fetched and predecoded by the host processor 30 in IF stage, and the host processor 30 issues a coprocessor command to the coprocessor 32 through the interface signals A (COMMAND/ADDRESS), B (COMMAND IDENTIFICATION), C (ADDRESS IDENTIFICATION) and D (READ/WRITE IDENTIFICATION) in ID/MEM stage.

In Table 1, "COP #imm: 12" instruction is to request that the coprocessor 32 perform a specific operation designated by the immediate value (#imm: 12). A timing diagram for execution of COP #imm:12 instruction is illustrated in FIG. 9.

Figure 9:
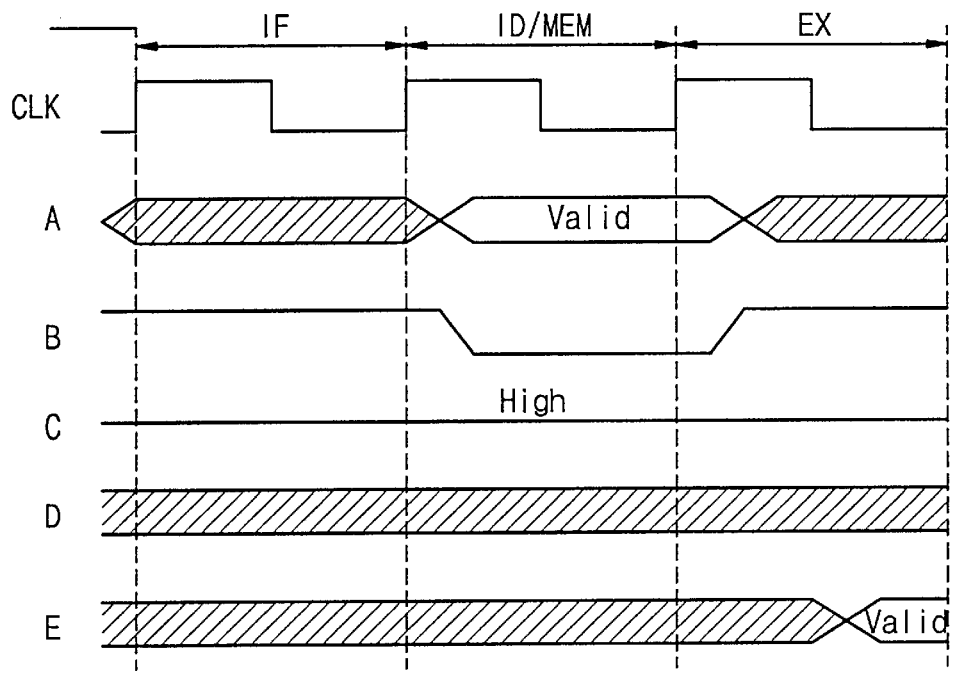
FIG. 9 is a timing diagram illustrating an execution of a coprocessor instruction in the system of FIG. 5.

With reference to FIG. 9, if a COP #imm: 12 instruction is fetched in IF stage, then a 12-bit immediate value (#imm: 12) is loaded on a command/address signal A, accompanying a command identification signal B being active (for example, low) in ID/MEM stage, to request the coprocessor 32 to perform designated operations. Then, the 12-bit immediate value (#imm: 12) is interpreted by the coprocessor 32. By arranging the 12-bit immediate field, a set of instructions for the coprocessor 32 is determined. In other words, the host processor 30 provides the coprocessor with a set of generic coprocessor instructions, which is specific to the coprocessor. A specific coprocessor instruction set can differ from a coprocessor to another. In EX stage, the coprocessor 32 executes the COP #imm: 12 instruction and then provides its status data E to the host processor 30. The host processor 30 can use the data E, along with status flags of the host processor 30 itself, for generating a next conditional branch instruction.

In Table 1, "CLD Reg, #imm:8" instruction and "CLD #imm:8, Reg" instruction are data exchange instructions between the host processor 30 and the coprocessor 32. "Reg" is a host processor register number, and "#imm:8" denotes an 8-bit immediate value that may be a coprocessor register address.

Figure 10:
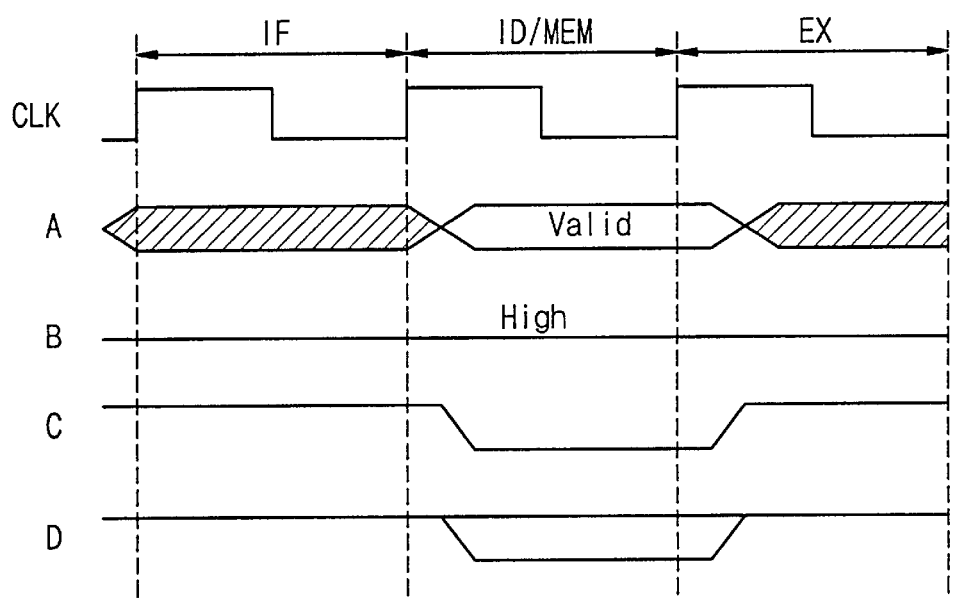
FIG. 10 is a timing diagram illustrating an execution of a data transfer instruction in the system of FIG. 5.

FIG. 10 is a timing diagram illustrating the execution of the data exchange instructions. CLD Reg, #imm:8 instruction is a CO_READ instruction, and CLD #imm:8, Reg instruction is a CO_WRITE instruction. If a CO_READ instruction is fetched, then the immediate value (#imm:8) is loaded on a command/address signal A, accompanying an address identification signal C being active (for example, low) in ID/MEM stage. When the signal C is active and a command identification signal B is inactive, 8-bit immediate value (#imm:8) is identified as a coprocessor register address. At this time, a read/write identification signal D remains high, so that data from the coprocessor 32 is transferred via data buses to the host processor 30.

Similarly, when a CO_WRITED instruction is fetched, the immediate value (#imm:8) is also loaded on the command/address signal A, accompanying the address identification signal C being active in ID/MEM stage. When the signal C active, the 8-bit immediate value (#imm:8) is identified as a coprocessor register address. At this time, the read/write identification signal D remains low, so that data from the host processor 30 is transferred via data buses to the coprocessor 32.

In Table 1, "JMP E, label", "CALL E, label" and "LNK E, label" instructions are conditional branch instructions. After an execution of a coprocessor instruction in EX stage of a pipelined operation, the host processor 30 is provided with coprocessor status data E (e.g., sign, overflow, and zero flags) from the coprocessor 32. The host processor 30 can utilize the status data E for generating a next conditional branch instruction, such as JMP, CALL, or LNK instruction, without additional coprocessor access operation, thereby considerably decreasing execution time of conditional branch instructions.

Figure 5:
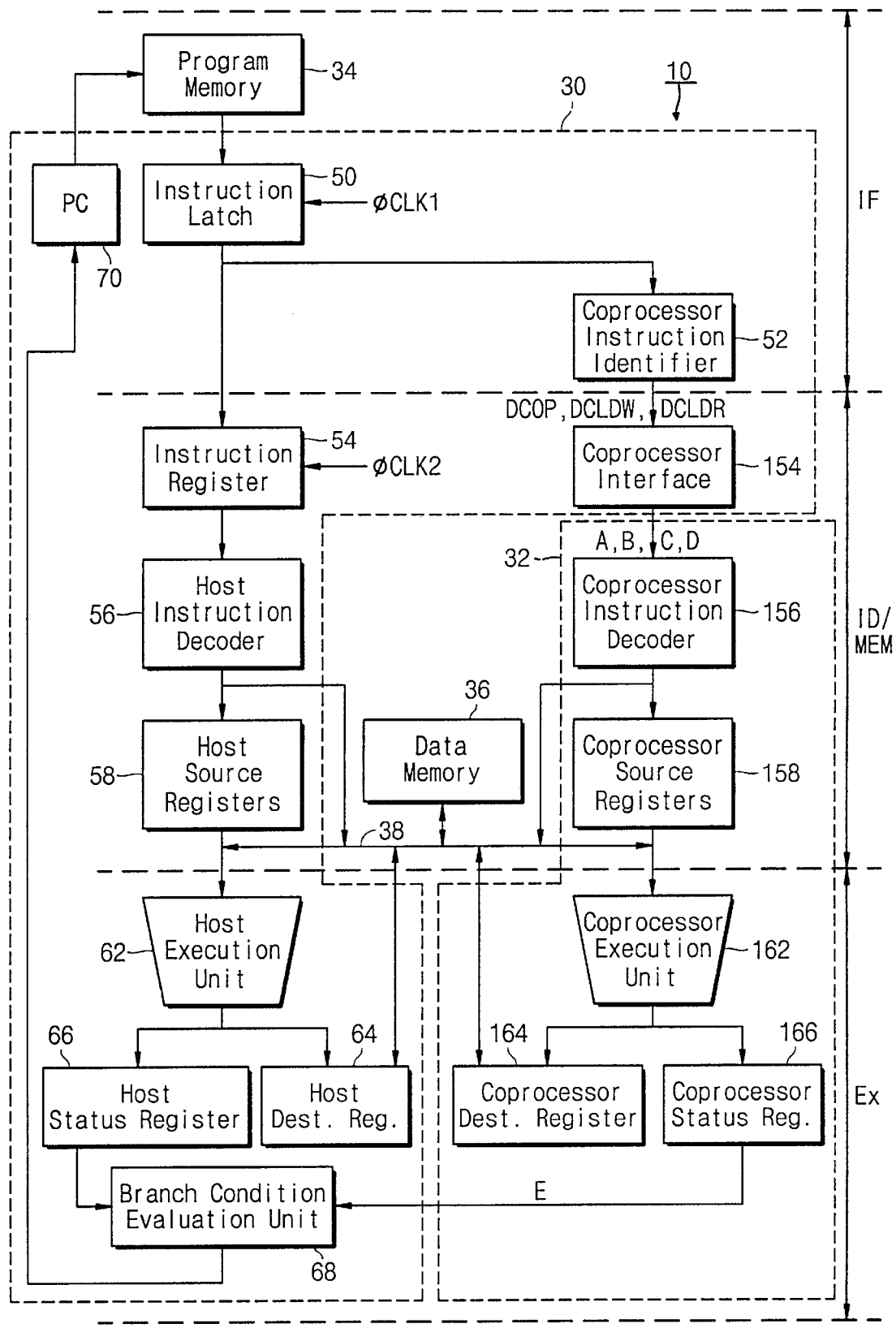
FIG. 5 is a block diagram illustrating a preferred embodiment of the host-coprocessor system of FIG. 3.

Referring to FIG. 5, there is a detailed block diagram illustrating a preferred embodiment of the host processor 30 and the coprocessor 32 configured to operate as a three-stage pipeline. In the host processor 30, an instruction latch 50, a coprocessor instruction identifier 52, and a program counter 70 serve as an instruction fetch circuit to fetch instructions. The program counter 70 indicates a location of the program memory 34 where an instruction to be fetched is stored. The instruction latch 50 latches the instruction fetched from the program memory 34. The coprocessor instruction identifier 52 checks whether the fetched instruction is a coprocessor instruction. If the fetched instruction is identified as a coprocessor instruction, the coprocessor instruction identifier 52 predecodes the fetched instruction and generates a plurality of predecoding signals DCOP, DCLDW and DCLDR.

The host processor 30 also includes, for operations in ID/MEM stages, an instruction register 54, a host instruction decoder 56, host source registers 58, and a coprocessor interface unit 154. The instruction register 54 is connected to the instruction latch 50. The host instruction decoder 56 is connected to the instruction register 54 and the data memory 36. The host source registers 58 are connected to the host instruction decoder 56 and the data memory 36. The coprocessor interface unit 154 is connected to the coprocessor instruction identifier 52. The coprocessor interface unit 154 generates a plurality of coprocessor interface signals A, B, C and D in response to the predecoding signals DCOP, DCLDW and DCLDR.

A host instruction execute stage (or circuit) of the host processor 30 comprises a host execution unit 62 connected to the data memory 36 and the host source registers 58, a host destination register 64 connected to both the data memory 36 and the host execution unit 62, a host status register 66 connected to the host execution unit 62, and a branch condition evaluation unit 68 connected to the host status register 66, the coprocessor 32 and the program counter 70. The branch condition evaluation unit 68 checks statuses of both the host processor 30 and the coprocessor 32.

The coprocessor 32 comprises a coprocessor instruction decode/memory access circuit and a coprocessor instruction executes circuit. The coprocessor instruction decode/memory access circuit is connected to the instruction fetch circuit and the data memory 36. The coprocessor instruction decode/memory access circuit comprises a coprocessor instruction decoder 156 connected to the coprocessor interface unit 154 and the data memory 36, and coprocessor source registers 158 connected to the coprocessor instruction decoder 156 and the data memory 36. The coprocessor instruction execute circuit comprises a coprocessor execution unit 162 connected to the coprocessor source registers 158 and the data memory 36, a coprocessor destination register 164 connected to the coprocessor execution unit 162 and the data memory 36, and a coprocessor status register 166 connected to the coprocessor execution unit 162 and the branch condition evaluation unit 68 of the host processor 30.

During IF period, an instruction indicated by the program counter 70 is fetched from the program memory 34 and latched by the instruction latch 50 synchronized with a first internal clock signal φCLK1 (referring to FIG. 6). Output of the instruction latch 50 is provided to the coprocessor instruction identifier 52. The coprocessor instruction identifier 52 checks whether the fetched instruction is a coprocessor instruction. If the fetched instruction is identified as a coprocessor instruction, the coprocessor instruction identifier 52 predecodes the coprocessor instruction and generates predecoding signals DCOP, DCLDW, and DCLDR based on the predecoded results. Signal DCOP becomes active when a COP #imm:12 instruction is fetched, signal DCLDW becomes active when a CLD #imm:8, Reg instruction is fetched, and signal DCLDR becomes active when a CLD Reg, #imm:8 instruction is fetched.

In ID/MEM stage, the instruction register 54 is loaded with the output of the instruction latch 50 (i.e., a fetched instruction), synchronizing with a second internal clock signal φCLK2 (referring to FIG. 6). If the fetched instruction is a host instruction, the host instruction decoder 56 decodes the host instruction. Then, it is ready to execute operations designated by the host instruction by means of accessing the data memory 36 and the host source registers 58, if necessary. If the fetched instruction is not a defined instruction (or it is a coprocessor instruction), the host processor 30 performs no operation. In this case, the coprocessor interface unit 154 receives the predecoding signals DCOP, DCLDW and DCLDR from the coprocessor instruction identifier 52 and issues a coprocessor command corresponding to the fetched coprocessor instruction by generating the coprocessor interface signals A, B, C and D.

Figure 7:
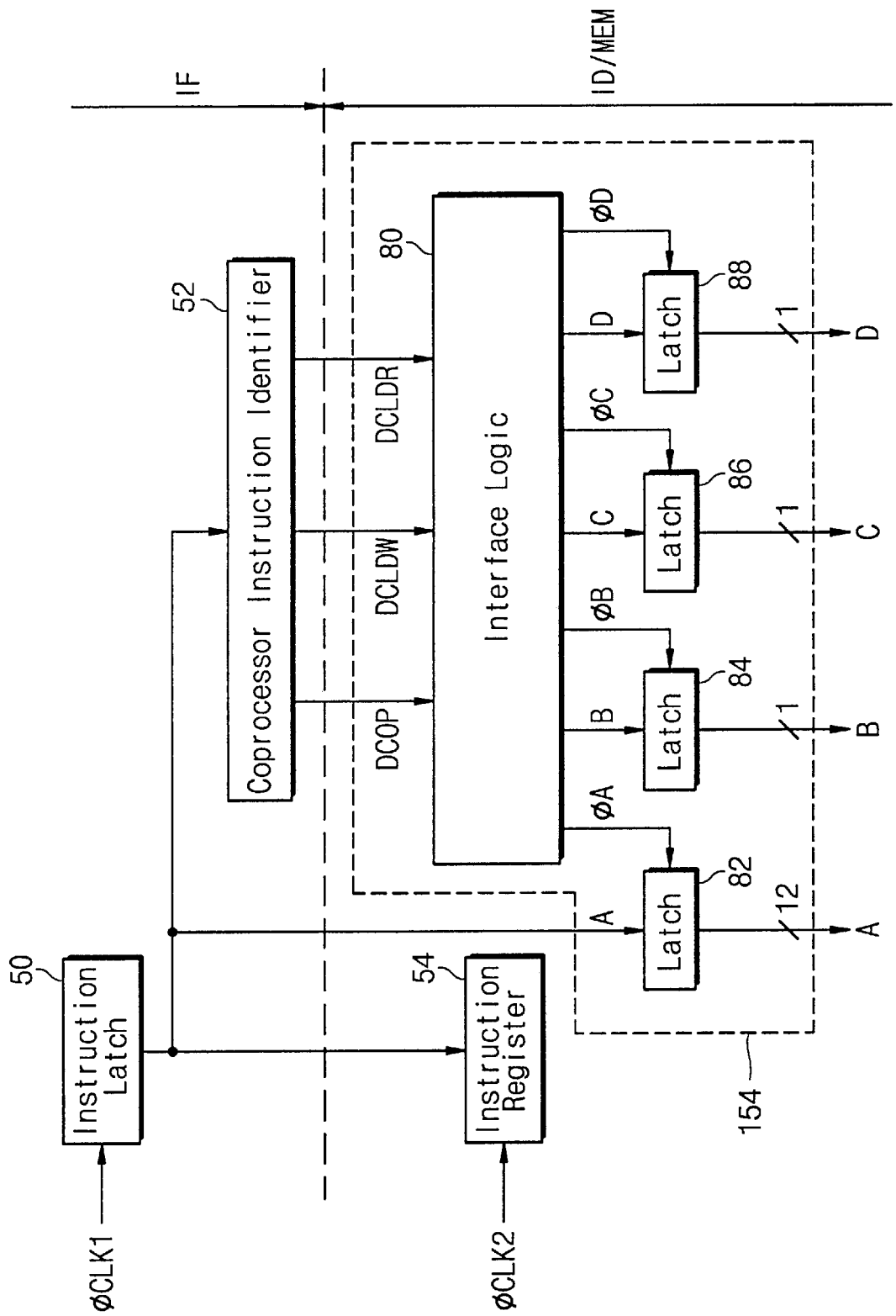
FIG. 7 is a detailed block diagram of a preferred embodiment of the coprocessor interface unit in FIG. 5.
Figure 8A:
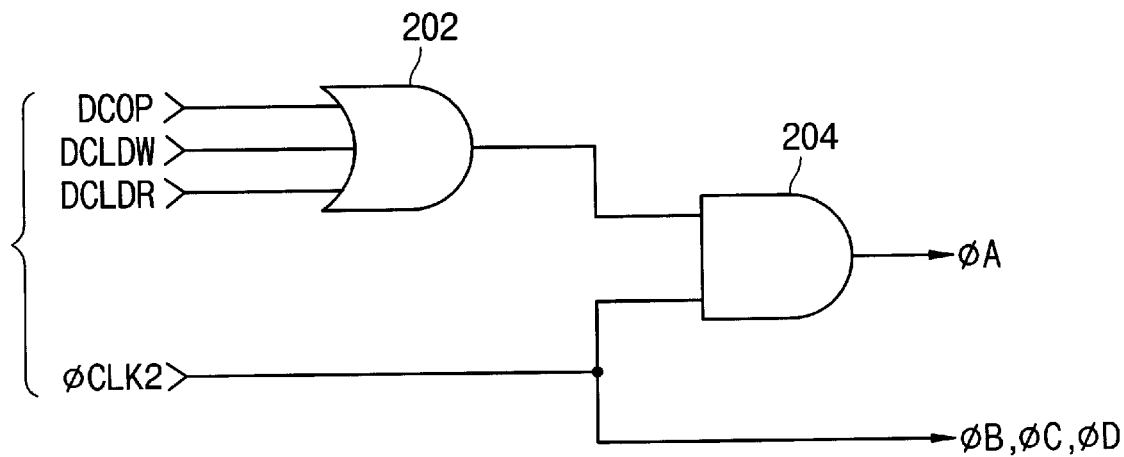
FIGS. 8A and 8B are detailed circuit diagrams of preferred embodiments of a latch clock generator logic and an interface signal generator logic, respectively.
Figure 8B:
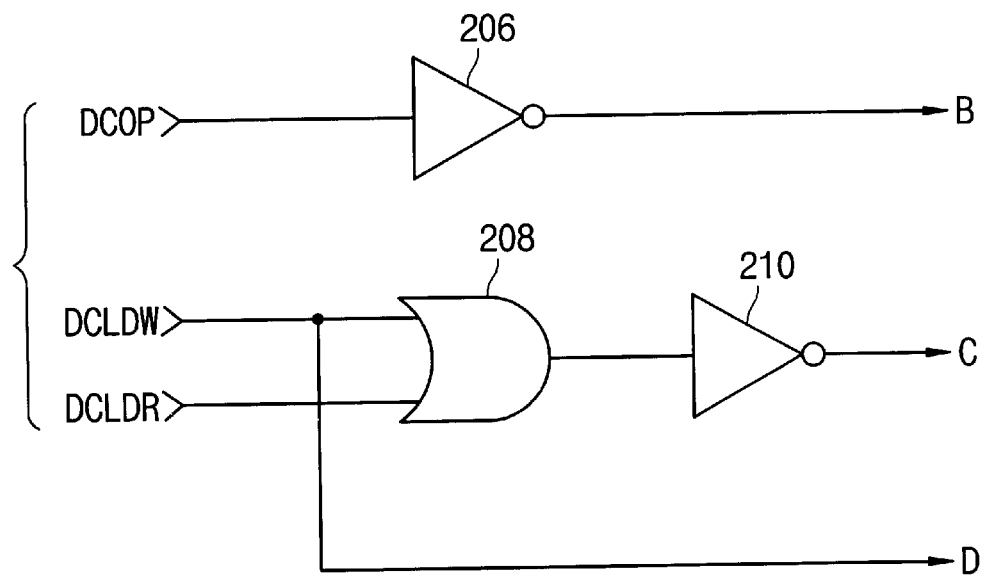

With reference to FIG. 7, a preferred embodiment of the coprocessor interface unit 154 comprises an interface logic-circuit 80 and four latches 82, 84, 86 and 88. The interface logic circuit 80 generates the interface signals B, C and D and latch clock signals φA, φB, φC and φD in response to the predecoding signals DCOP, DCLDW and DCLDR from the coprocessor instruction identifier 52. Detailed circuit configurations of the interface logic circuit 80 are shown in FIGS. 8A and 8B. FIG. 8A illustrates a latch clock generator logic and FIG. 8B illustrates an interface signal generator logic.

In FIG. 8A showing a preferred embodiment of a latch clock generator logic, an OR gate 202 has three inputs which are applied with the predecoding signals DCOP, DCLDW and DCLDR, respectively. An output of the OR gate 202 is coupled to an input of an AND gate 204 whose other input is provided with the second internal clock signal φCLK2. The AND gate 204 outputs a latch clock signal φA for the latch 82. The latch clock signal +A is synchronized with the second internal clock signal φCLK2 (or CLK). The interface signal A is generated only when one of the signals DCOP, DCLDW and DCLDR becomes active, preventing power consumption caused by frequent value changes of the signal A. Each of the latch clock signals φB, φC and φD for the latches 84, 86 and 88 has the same phase as that of the second internal clock signal φCLK2.

FIG. 8B shows a preferred embodiment of an interface signal generator logic comprising a first inverter 206, an OR gate 208, and a second inverter 210. The first inverter 206 receives the 25 predecoding signal DCOP and outputs the interface signal B. The OR gate 208 has two inputs applied with the predecoding signals DCLDW and DCLDR, respectively, and an output coupled to the second inverter 210. The second inverter 210 outputs the interface signal C. The predecoding signal DCLDW is directly used as interface signal D.

Referring again to FIG. 7, the latches 82, 84, 86, and 88 latch the interface signals A, B, 30 C, and D, respectively, synchronizing with the latch clock signals φA, φB, φC, and φD, respectively. The latch 82 directly latches the immediate value (such as a coprocessor register address or a coprocessor instruction) loaded on an instruction from the instruction latch 50.

Turning back to FIG. 5, in ID/MEM stage, the coprocessor instruction decoder 156 decodes the interface signals (i.e., the coprocessor commands) from the coprocessor interface unit 154 and provides for executions of the coprocessor instructions, if necessary, by means of accessing the data memory 36 and the coprocessor source registers 158.

For EX stage, for example, the host execution unit 62 such as an ALU (arithmetic and logic unit), the host status register 66 to store host processor status data (e.g., sign, carry, overflow, zero and other flags), and the branch condition evaluation unit 68 to check the conditional flags of the host status register 66 are provided for host processor 30. A certain host destination register 64 in host register file is also involved in EX stage. Similarly, a coprocessor execution unit 162 (such as a specific arithmetic-function unit and a normal arithmetic-function unit), a certain coprocessor destination register in a coprocessor register file, and a coprocessor status register 166 are provided for the coprocessor 32.

During EX stage, after an execution of a coprocessor instruction, the branch condition evaluation unit 68 is supplied with coprocessor status data E (e.g., sign, overflow, and zero flags) from the coprocessor status register 166. Then, the host processor 30 can use the status data for a next conditional branch instruction, such as a jump (JMP), a subroutine call (CALL), or a link (LNK) instruction, without any coprocessor access operation. This, along with the interface signals generated in ID/MEM period, makes it possible to synchronize pipelined operations of the host processor 30 and the coprocessor 32.

In a multi-processor system, data transfer between processors is an important factor to determine efficiency of the overall system. Suppose a processor receives a certain input data stream. In order for the processor to share the data with other processors, there should be an efficient mechanism to transfer the data between the processor and the others. Such data transfers are accomplished by means of a single shared data memory, such as data memory 36 in FIG. 3. The shared data memory in a multi-processor system has some inherent problems such as data hazards and deadlocks.

The host-coprocessor system 10 of the present invention, however, accesses the shared data memory 36 only at time designated by the host processor 30. That is, during that time, the coprocessor 32 only accesses the memory, while the host processor 30 is guaranteed not to access the data memory 36. Therefore, there is no contention over the shared data memory 36. Another advantage of the host-coprocessor system is that the coprocessor 32 can access the data memory 36 in its own bandwidth.

Direct data transfers between the host processor 30 and the coprocessor 32 are performed only with respect to CLD instructions. CO_WRITE instructions (CLD #imm:8, Reg) put data of a general-purpose register of the host processor 30 on data buses and issue the address (#imm:8) of a coprocessor internal register on the signal A accompanying the signal C active (Low) and the signal D active (Low). CO_READ instructions (CLD Reg, #imm:8) work similarly, except that data of the coprocessor internal register addressed by a 8-bit immediate value is read into a general-purpose register through data buses during the signal C active and the signal D deactivated (High).

The coprocessor 32 is passive. That is, it does not have its own programs. To perform a branch operation according to a status of the coprocessor 32 (which may be an outcome of a coprocessor instruction execution), conditional branch instructions (JMP, CALL and LNK) of the host processor 30 directly refer to values of E<2:0>signal containing status data of the coprocessor 32.

Loop instructions with little or no loop control overhead are important for DSP programs, because otherwise they spend a significant portion of execution time for loop controls. To reduce loop control overhead, the host processor provides JNZD instruction (referring to Table 1). JNZD performs the decrement by 1 of a loop parameter and branch, in a single instruction with a delay slot. Loop overhead of JNZD instruction is just 1 cycle, which is assigned to the instruction itself. Since the loop parameter can be any of general-purpose registers, loop nestings are also possible.

Coprocessor Implementation

A 16-bit fixed-point DSP processor is, for example, implemented as the coprocessor 32 for low-end DSP applications. It is designed as one of the DSP coprocessor engines for the host processor 30, which targets cost-sensitive and low-end multimedia DSP applications. Generic coprocessor instructions are renamed according to intended operations on the coprocessor 32, including DSP data type and DSP addressing mode. The coprocessor comprises four units: MU (Multiplier Unit), AU (Arithmetic Unit), RPU (RAM Pointer Unit), and IU (Interface Unit). MU (Multiplier Unit) basically includes a 24-bit by 16-bit parallel multiplier and a 24-bit adder for multiply-and-accumulate (MAC) operations. Hence, 16-bit by 16-bit MAC operations are performed in two cycles in the coprocessor 32. AU performs 16-bit arithmetic and shift operations for DSP. RPU of the coprocessor comprises three data memory pointers and two control blocks for pointer modulo calculations. The pointers are used for accessing the data memory 36 for a 16-bit data operand. Since two 16-bit data operands can be fetched simultaneously in a single cycle for MAC operation, the data memory 36 should be partitioned into two parts: X and Y memory. Note that the data memory 36 that the coprocessor 32 accesses through the pointers is the same data memory that the host processor 30 accesses (see FIG. 3).

As explained above, there is no contention over the data memory 36 because the coprocessor 32 accesses the data memory 36 at ID/MEM stage of the corresponding coprocessor instruction. IU is for communications between the host processor 30 and coprocessor 32. It decodes the coprocessor interface signals from the host processor and controls the other units, according to the decoding result.

With the coprocessor, an N-tap real FIR filter and LMS adaptive filter can be implemented with 3N+X cycles and 8N+X cycles, where X is additional cycles for input/output. The host processor 30 and the coprocessor 32 can be implemented using 0.5 $\mu$m double metal CMOS process. Die sizes of the host processor and coprocessor are about 0.85 and 0.6 mm , respectively. Power consumptions of the host processor and the coprocessor are 0.10 mW and 0.24 mW per MIPS at 3V, respectively. And they can run up to 20 MHz (about 20 MIPS).

The host-coprocessor SOC architecture of the present invention can also be used for digital caller identification applications. By using host-plus-coprocessor platform, total number of components can be reduced to a bare minimum, and total power consumption which is a key factor to telephony applications, can be minimized. DTMF (Dual Tone Multiple Frequency) generator, FSK (Frequency Shift Keying) demodulator for ID extraction, and CAS (CPE Alert Signal) detector part of the caller ID algorithm are mapped on the coprocessor and result in 0.2 MIPS, 0.7 MIPS and 1.6 MIPS, respectively. Program memories required for DTMF, FSK, and CAS are 90, 580, and 512 bytes, respectively. Since each of DSP algorithms runs exclusively, MIPS required for the DSP algorithms is 1.6 MIPS. A system clock for the host-coprocessor system runs at 5 MHz, which provides enough computing power for DSP operations as well as microcontroller operations. Hence the power consumption of the host-coprocessor system for the digital caller ID application will be well below 1.7 mW at 3V, 25 degrees, typical process condition. As an analog front end, a 10-bit ADC (Analog to Digital Converter) can be used, whose power consumption is about 1.5 mW at 3 V, 25 degrees, typical process condition. Hence our SOC solution for a microcontroller with the digital caller ID function estimates to consume less than 4.0 mW at 3V, 25 degrees, typical process condition.

As described above, a microprocessor or microcontroller according to the present invention has an efficient and powerful coprocessor interface architecture. This interface architecture targets low-power RISC microprocessors of a relatively low bit width. The heart of the architecture is "efficiency and flexibility" in designs. Advantageously, the host-coprocessor SOC architecture of the present invention includes efficient, low cost, and speedy pipelined operations. In addition, since the coprocessor is synchronized with the host processor, little or no extra communication overhead is incurred. Further, since the coprocessor can be regarded as a peripheral block to the host processor, only the coprocessor (not the host processor) needs to be revised when it is required to modify or upgrade a specific function of the coprocessor.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A data processing system comprising:
    a program memory for storing instructions:
    a host processor for performing pipelined operations and for predecoding an instruction fetched from the program memory during a fetch cycle of the instruction and for issuing a command corresponding to the instruction; and
    at least one coprocessor for performing other pipelined operations and for decoding the command received from the host processor during a decoding cycle of the instruction and for executing the decoded command during an execution cycle of the instruction, wherein the host processor generates a second predecoding signal based on predecoding the instruction fetched from the program memory, the second predecoding signal includes commands for transferring data from the coprocessor to the host processor.

2. The data processing system of claim 1, wherein the host processor predecodes an instruction fetched from the program memory when the host processor identifies the instruction as a coprocessor instruction for the coprocessor.

3. The data processing system of claim 1, wherein the host processor generates coprocessor interface signals when an.instruction fetched from the program memory is identified as a coprocessor instruction, and transfers the command to the coprocessor with the coprocessor interface signals.

4. The data processing system of claim 1, wherein the coprocessor provides the host processor with coprocessor status data representing status of the coprocessor after executing the command received from the host processor.

5. The data processing system of claim 1, wherein the coprocessor is adapted to execute digital signal processing (DSP) functions.

6. The data processing system of claim 1, further comprising a data memory connected to the host processor and the coprocessor, wherein the host processor and the coprocessor access the data memory at different times designated by the host processor.

7. The data processing system of claim 1, wherein the host processor generates a first predecoding signal based on predecoding the instruction fetched from the program memory, wherein the first predecoding signal includes instructions requesting the coprocessor to perform a specific operation designated by an immediate value loaded on the first predecoding signal.

8. The data processing system of claim 4, wherein the host processor receives the coprocessor status data from the coprocessor, the host processor for generating at least one conditional branch instruction which includes data for performing at least one next operation of the pipelined operations.

9. The data processing system of claim 1, wherein the second predecoding signal includes at least one host processor register number and at least one coprocessor register address, whereby the data stored in at least one register designated by the at least one coprocessor register address is transferred to at least one register designated by the at least one host register number.

10. The data processing system of claim 8, wherein the host processor generates a third predecoding signal based on predecoding the instruction fetched from the program memory, the third precoding signal includes commands for transferring data from the host processor to the coprocessor.

11. The data processing system of claim 10, wherein the third predecoding signal includes at least one host processor register number and at least one coprocessor register address, whereby the data stored in at least one register designated by the at least one host register number is transferred to at least one register designated by the at least one coprocessor register address.

12. A data processing system comprising:
a program memory for storing instructions;
a host processor for performing pipelined operations on instructions received in sequence from the program memory, wherein the host processor fetches, decodes, and executes a host instruction, predecodes a coprocessor instruction during a fetch cycle of the coprocessor instruction, and issues interface signals based on results of predecoding the coprocessor instruction;
a coprocessor for performing pipelined operations based on the coprocessor instruction, wherein the-coprocessor decodes the interface signals received from the host processor during a decoding cycle of the coprocessor instruction and executes the coprocessor instruction responding to results of decoding the interface signals;
a data memory for storing data, the data memory being connected to the host processor and the coprocessor; and
an internal clock synchronized with a master clock for generating internal clock signals to the host processor for the pipelined operations.

13. The data processing system of claim 12, wherein the host processor includes:
an instruction fetch circuit for fetching the instructions in sequence from the program memory and for generating predecoding signals based on the instructions when the instructions are coprocessor instructions;
a host instruction decode/memory access circuit connected to the instruction fetch circuit and the data memory, for decoding the instructions fetched by the instruction fetch circuit when the fetched instructions are instructions for control functions, wherein the host instruction decode/memory access circuit generates the interface signals to the coprocessor; and
a host instruction execute circuit connected to the host instruction decode/memory access circuit and the data memory, for executing the instructions for control functions decoded by the host instruction decode/memory access circuit, wherein the host instruction execute circuit generates conditional branch instructions to the instruction fetch circuit responding to status data of the host processor and status data of the coprocessor received from the coprocessor.

14. The data processing system of claim 13, wherein the instruction fetch circuit includes:
at least one instruction latch for latching at least one instruction from the program memory; and
a coprocessor instruction identifier for determining whether the instruction fetched in the at least one instruction latch is a coprocessor instruction, for predecoding the fetched instruction identified as the coprocessor instruction, and for generating the predecoding signals to the host instruction decode/memory access circuit.

15. The data processing system of claim 13, wherein the host instruction decode/memory access circuit includes:.
a host instruction decoder for decoding the fetched instruction received from the instruction fetch circuit;
at least one host source register for receiving decoded results from the host instruction decoder and for generating data for executing the fetched instruction; and
a coprocessor interface unit for receiving the predecoding signals from the instruction fetch circuit and for generating the interface signals to the coprocessor.

16. The data processing system of claim 15, further including an instruction register for receiving the fetched instruction from the instruction fetch circuit and providing the fetched instruction to the host instruction decoder, wherein the instruction register is synchronized with a second internal clock signal from the internal clock.

17. The data processing system of claim 15, wherein the host instruction decoder provides the data memory with results of decoding the fetched instruction, whereby the data memory provides for data for executing the fetched instruction.

18. The data processing system of claim 15, wherein the host instruction execute circuit includes:
a host execution unit for receiving the decoded results from the host instruction decode/memory access circuit and data from the data memory, and for executing the instructions for control functions responding to the decoded results and the data;
a host status register connected to the host execution unit, for storing the status data of the host processor; and
a branch condition evaluation unit for receiving the status data of host processor from the host status register and the status data of coprocessor from the coprocessor, and for generating the conditional branch instructions to the instruction fetch circuit.

19. The data processing system of claim 15, wherein the coprocessor interface unit is synchronized with a second internal clock signal from the internal clock.

20. The data processing system of claim 15, the coprocessor interface unit includes:
a latch clock generator logic for generating a plurality of latch clock signals in response to a second internal clock signal and the predecoding signals;
an interface signal generator logic for generating the interface signals responding to the precoding signals; and
a plurality of latches for latching the interface signals in synchronization with the latch clock signals.

21. The data processing system of claim 20, wherein the latch clock generator logic includes:
an OR gate having inputs receiving the predecoding signals, each of the inputs receiving each of the predecoding signals;
an internal clock signal terminal for receiving a second internal clock signal from the internal clock and for providing the at least one first latch with the second internal clock signal as at least a first latch clock signal; and an AND gate having a first input connecting to an output of the OR gate, a second input connecting to the internal clock signal terminal, and an output providing the at least one second latch with at least one second latch clock signal.

22. The data processing system of claim 20, wherein the interface signal generator logic includes:

a first inverter having an input receiving a first signal of the predecoding signals from the instruction fetch circuit and an output providing the coprocessor with a first signal of the interface signals;

an AND gate having at least first and second inputs receiving at least second and third signals of the predecoding signals, respectively, wherein the second signal of the predecoding signals is provided to the coprocessor as a second signal of the interface signals; and a second inverter for inverting output of the AND gate and for providing the coprocessor with the inverted signal as a third signal of the interface signals.

23. The data processing system of claim 12, wherein the coprocessor includes:

a coprocessor instruction decode/memory access circuit for receiving the interface signals from the host processor and for decoding the interface signals, wherein the coprocessor instruction decode/memory access circuit provides the data memory with results of decoding the interface signals; and a coprocessor instruction execute circuit for receiving the decoded results from the coprocessor instruction decode/memory access circuit and data from the data memory designated by the decoded results, and for executing the coprocessor instruction in response to the data and the decoded results.

24. The data processing system of claim 23, wherein the coprocessor instruction execute circuit includes:

a coprocessor execution unit for receiving the data from the data memory and the decoded results from the coprocessor instruction decode/memory access circuit, and for executing the coprocessor instruction in response to the data and the decoded results; and a coprocessor status register connected to the coprocessor execution unit and the host processor, for storing the status data of the coprocessor and providing the status data to the host processor.

25. A method for performing operations of pipelined instructions in sequence in a data processing system for performing host instructions for normal control functions and for performing coprocessor instructions for additional specific functions, the method comprising the steps of:

(a) fetching an instruction from a program memory in a fetch stage of the instruction;

(b) determining during the fetch stage whether the fetched instruction is a coprocessor instruction for a specific function;

(c) predecoding the fetched instruction during the fetch stage when the fetched instruction is the coprocessor instruction;

(d) issuing a coprocessor command corresponding to the fetched instruction in a decode/memory access stage of the instruction, wherein the coprocessor command is based on predecoded results in the step (c);

(e) decoding the coprocessor command during the decode/memory access stage; and (f) executing the coprocessor command as designated by decoded results of the step (e) at a time designated by a host processor of the data processing system, wherein during the time designated the host processor does not access the program memory shared with a coprocessor of the data processing system.

26. The method of claim 25, further comprising the steps of:

(g) decoding the instruction fetched in the step (a) in a decode/memory access stage of the instruction when the fetched instruction is a host instruction for normal control function; and (h) executing the host instruction in a execute stage of the instruction in response to decoded results of the step (g).

27. The method of claim 26, further comprising the steps of:

providing for a first status data representing status of the data processing system after performing the execution of the coprocessor instruction in the step (f);

providing for a second status data representing status of the data processing system after performing the execution of the host instruction in the step (h); and evaluating a next conditional branch instruction from the first and the second status data, wherein the next conditional branch instruction is used in a next fetch stage of a next instruction to be fetched from the program memory.

28. The method of claim 25, further comprising the step of synchronizing the fetch stage and the decode/memory access stage with a first internal clock signal and a second internal clock signal, respectively.

29. The method of claim 25, wherein the step (c) comprises the step of generating a second predecoding signal based on predecoding the fetched instruction, the second predecoding signal comprises at least one host processor register number and at least one coprocessor register address, whereby the data stored in at least one register designated by the at least one coprocessor register address is transferred to at least one register designated by the at least one host register number.

* * * * *